United States Patent
Berczik et al.

(10) Patent No.: US 9,915,154 B2
(45) Date of Patent: Mar. 13, 2018

(54) CERAMIC MATRIX COMPOSITE AIRFOIL STRUCTURES FOR A GAS TURBINE ENGINE

(75) Inventors: Douglas M. Berczik, Manchester, CT (US); Gabriel L. Suciu, Glastonbury, CT (US); Brian D. Merry, Andover, CT (US); Alvanos Ioannis, West Springfield, MA (US); Christopher M. Dye, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1397 days.

(21) Appl. No.: 13/116,093

(22) Filed: May 26, 2011

(65) Prior Publication Data
US 2012/0301312 A1    Nov. 29, 2012

(51) Int. Cl.
| | |
|---|---|
| F01D 5/28 | (2006.01) |
| C04B 37/00 | (2006.01) |
| F01D 5/14 | (2006.01) |
| F01D 9/04 | (2006.01) |
| F01D 25/24 | (2006.01) |

(52) U.S. Cl.
CPC ............. *F01D 5/282* (2013.01); *C04B 37/00* (2013.01); *F01D 5/147* (2013.01); *F01D 5/284* (2013.01); *F01D 9/041* (2013.01); *F01D 25/246* (2013.01); *C04B 2235/5244* (2013.01); *C04B 2237/365* (2013.01); *C04B 2237/38* (2013.01); *C04B 2237/76* (2013.01); *F05D 2240/12* (2013.01); *F05D 2300/6033* (2013.01); *Y10T 29/49321* (2015.01)

(58) Field of Classification Search
USPC ............................................. 416/229 R, 230
See application file for complete search history.

(56) References Cited

U.S. PATENT DOCUMENTS

| | | | | |
|---|---|---|---|---|
| 4,195,396 | A * | 4/1980 | Blazek | 29/889 |
| 7,093,359 | B2 | 8/2006 | Morrison et al. | |
| 7,122,224 | B2 * | 10/2006 | Das et al. | 427/282 |
| 7,311,497 | B2 * | 12/2007 | Sharma et al. | 416/97 A |
| 7,322,796 | B2 * | 1/2008 | Pietraszkiewicz et al. | 416/193 A |
| 7,371,049 | B2 * | 5/2008 | Cunha et al. | 416/97 A |
| 7,452,182 | B2 * | 11/2008 | Vance et al. | 415/135 |
| 2005/0254942 | A1 * | 11/2005 | Morrison et al. | 415/200 |
| 2010/0183435 | A1 | 7/2010 | Campbell et al. | |
| 2011/0058949 | A1 | 3/2011 | Marra | |

FOREIGN PATENT DOCUMENTS

| | | |
|---|---|---|
| JP | 7189607 | 7/1995 |
| JP | H07189607 A * | 7/1995 |
| JP | 2003148105 | 5/2003 |
| WO | 0053895 | 9/2000 |

OTHER PUBLICATIONS

Extended EP Search Report for Application No. 12169245.3 dated Jul. 7, 2015.

* cited by examiner

*Primary Examiner* — Richard Edgar
*Assistant Examiner* — Michael Sehn
(74) *Attorney, Agent, or Firm* — Carlson, Gaskey & Olds, P.C.

(57) ABSTRACT

A Ceramic Matrix Composite (CMC) airfoil segment for a gas turbine engine includes a box-shape fiber geometry which defines a rectilinear pressure side bond line and a rectilinear suction side bond line.

24 Claims, 7 Drawing Sheets

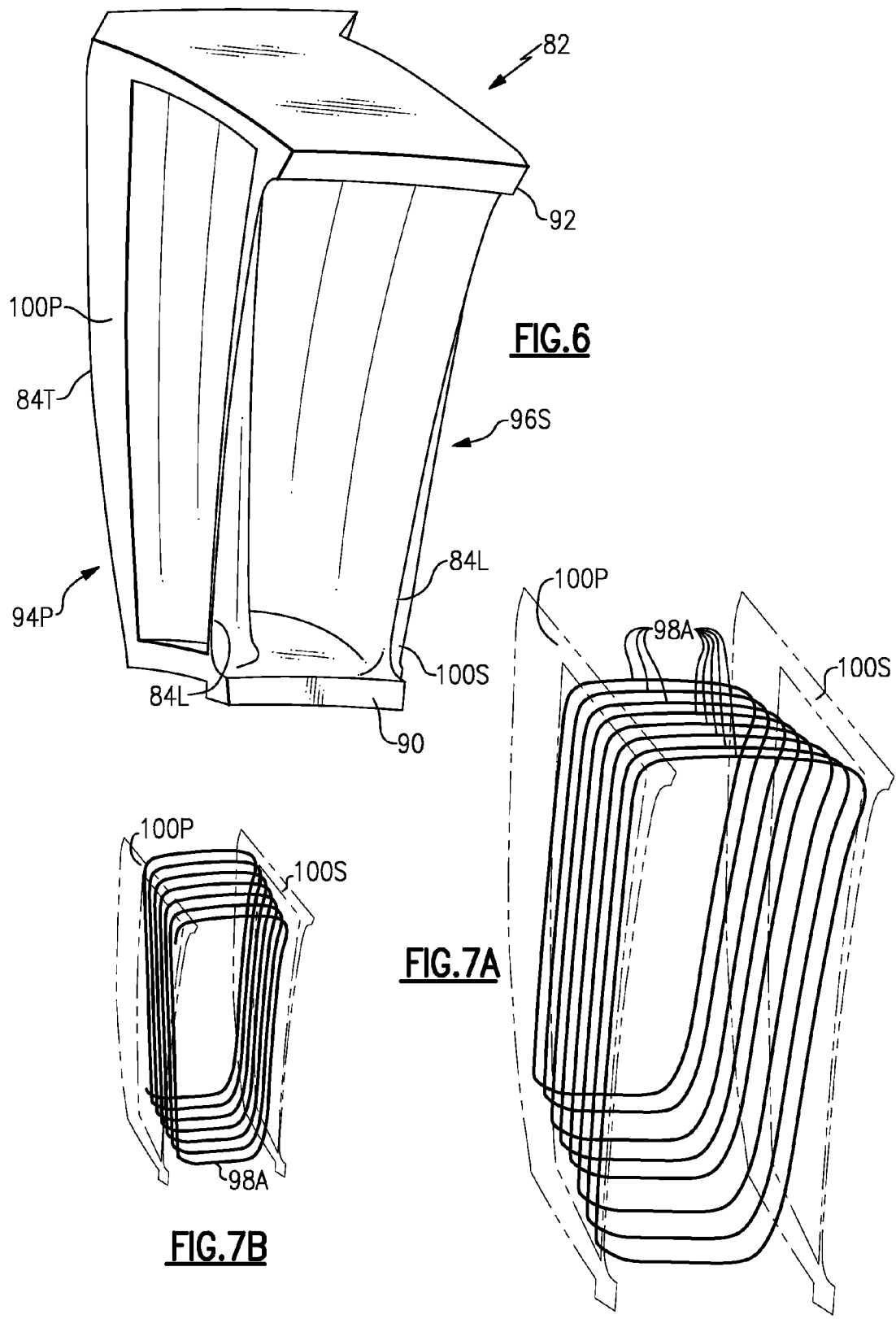

CERAMIC MATRIX COMPOSITE AIRFOIL STRUCTURES FOR A GAS TURBINE ENGINE

BACKGROUND

The present disclosure relates to a gas turbine engine, and more particularly to Ceramic Matrix Composites (CMC) components therefor.

Components in sections of gas turbine engines which operate at elevated temperatures in a strenuous, oxidizing type of gas flow environment are typically manufactured of high temperature superalloys. CMC materials provide higher temperature capability than metal alloys and a high strength to weight ratio. Ceramic matrix composite materials, however, require particular manufacturing approaches as the fiber orientation primarily determines the strength capability.

SUMMARY

A Ceramic Matrix Composite (CMC) airfoil segment for a gas turbine engine according to an exemplary aspect of the present disclosure includes a box-shape fiber geometry which defines a rectilinear pressure side bond line and a rectilinear suction side bond line.

A Ceramic Matrix Composite (CMC) structure for a gas turbine engine according to an exemplary aspect of the present disclosure includes a multiple of CMC airfoil segments bonded between a CMC outer ring and a CMC inner ring, each of the multiple of CMC airfoil segments of a box shape fiber geometry which defines a rectilinear pressure side bond line and a rectilinear suction side bond line.

A method of assembling a Ceramic Matrix Composite (CMC) structure for a gas turbine engine according to an exemplary aspect of the present disclosure includes bonding a CMC airfoil segment at a rectilinear pressure side bond line and a rectilinear suction side bond line.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 6 is a perspective view of a single CMC airfoil segment;

FIG. 7A is a perspective view of one non-limiting embodiment of a box-shaped CMC structural fiber orientation for the CMC airfoil segment of FIG. 6;

FIG. 7B is a perspective view of another non-limiting embodiment of a box-shaped CMC structural fiber orientation for the CMC airfoil segment of FIG. 6;

DETAILED DESCRIPTION

Figure 1:
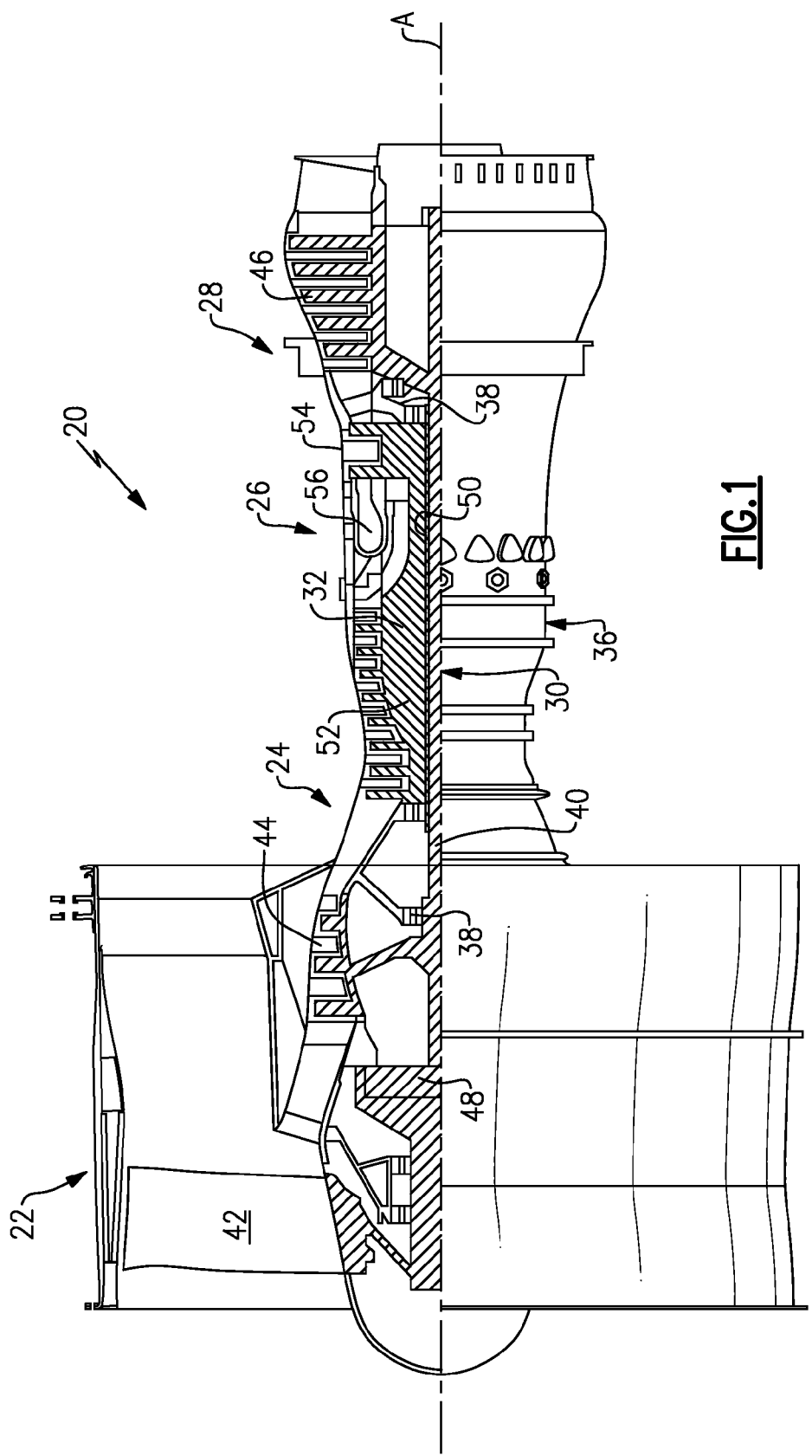
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
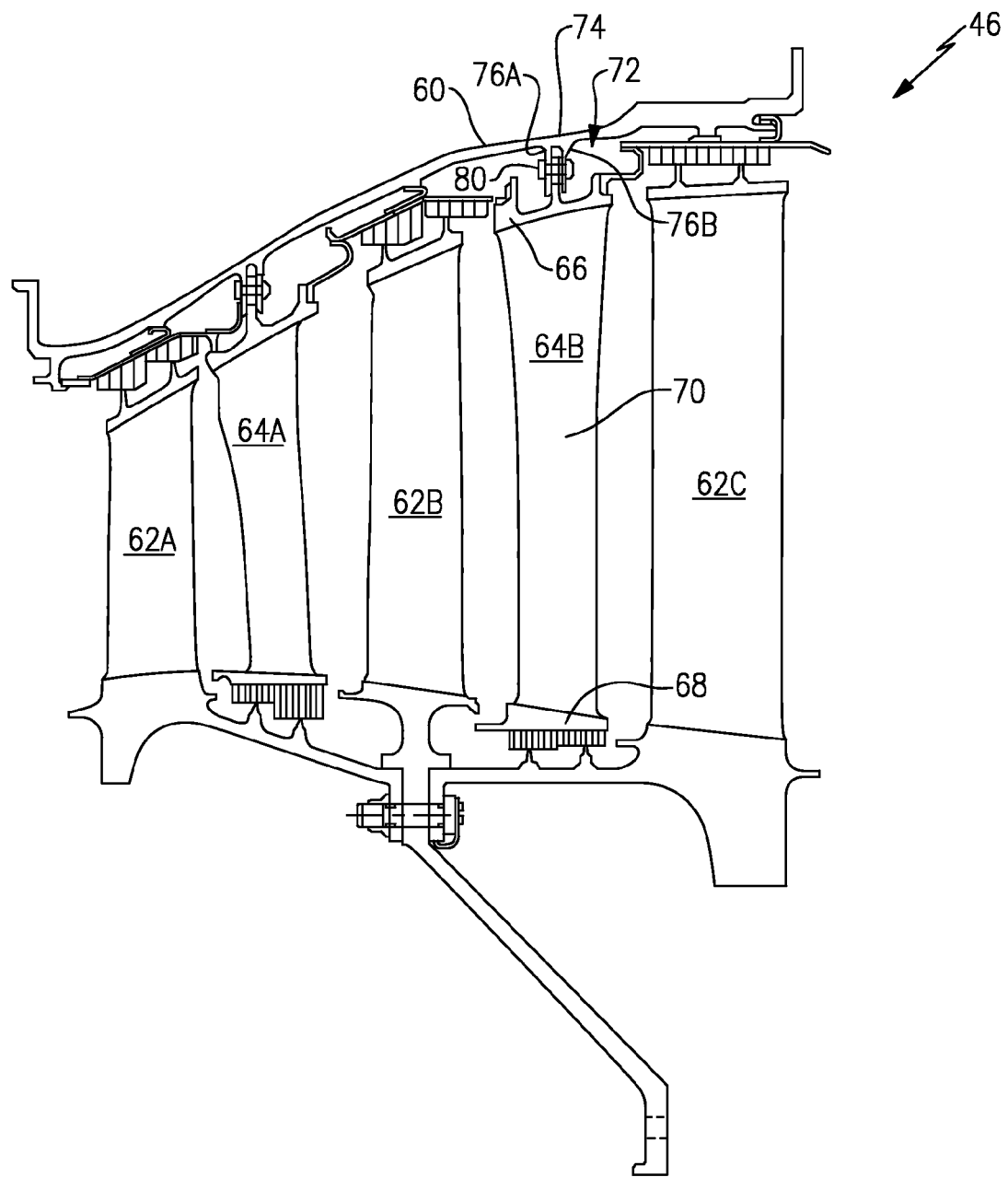
FIG. 2 is an enlarged sectional view of a section of the gas turbine engine.

With reference to FIG. 2, the low pressure turbine 46 generally includes a low pressure turbine case 60 with a multiple of low pressure turbine stages. In the disclosed non-limiting embodiment, the low pressure turbine case 60 may be manufactured of a ceramic matrix composite (CMC) material or metal super alloy. It should be understood that examples of CMC material for all componentry discussed herein may include, but are not limited to, for example, S200 and SiC/SiC. It should be also understood that examples of metal superalloy for all componentry discussed herein may include, but are not limited to, for example, INCO 718 and Waspaloy. Although depicted as a low pressure turbine in the disclosed embodiment, it should be understood that the concepts described herein are not limited to use with low pressure turbine as the teachings may be applied to other sections such as high pressure turbine, high pressure compressor, low pressure compressor and intermediate pressure turbine and intermediate pressure turbine of a three-spool architecture gas turbine engine.

The rotor structures 62A, 62B, 62C are interspersed with vane structures 64A, 64B. It should be understood that any number of stages may be provided. Each vane structure 64A, 64B is manufactured of a ceramic matrix composite (CMC) material to define a ring-strut-ring full hoop structure. It should be understood that the term full hoop is defined herein as an uninterrupted member such that the vanes do not pass through apertures formed therethrough as in conventional stator assemblies.

Ceramic matrix composite (CMC) materials advantageously provide higher temperature capability than metal and a high strength to weight ratio. The vane structure 64B will be described in detail hereafter, however, it should be understood that each of the vane structures 64A, 64B are generally comparable such that only the single vane structure 64B need be described in detail.

Figure 3:
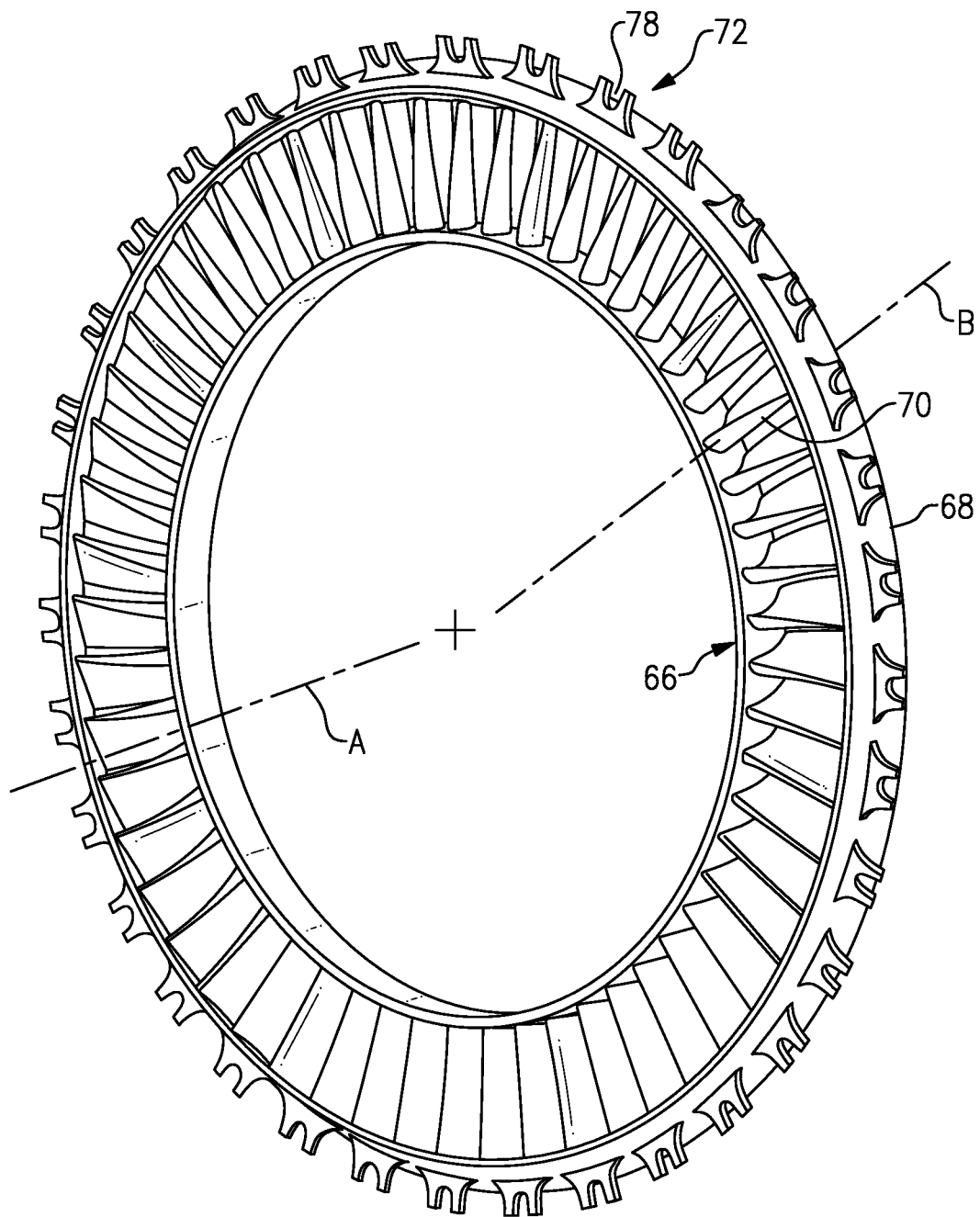
FIG. 3 is a perspective view of the CMC ring vane structure for a gas turbine engine.
Figure 4:
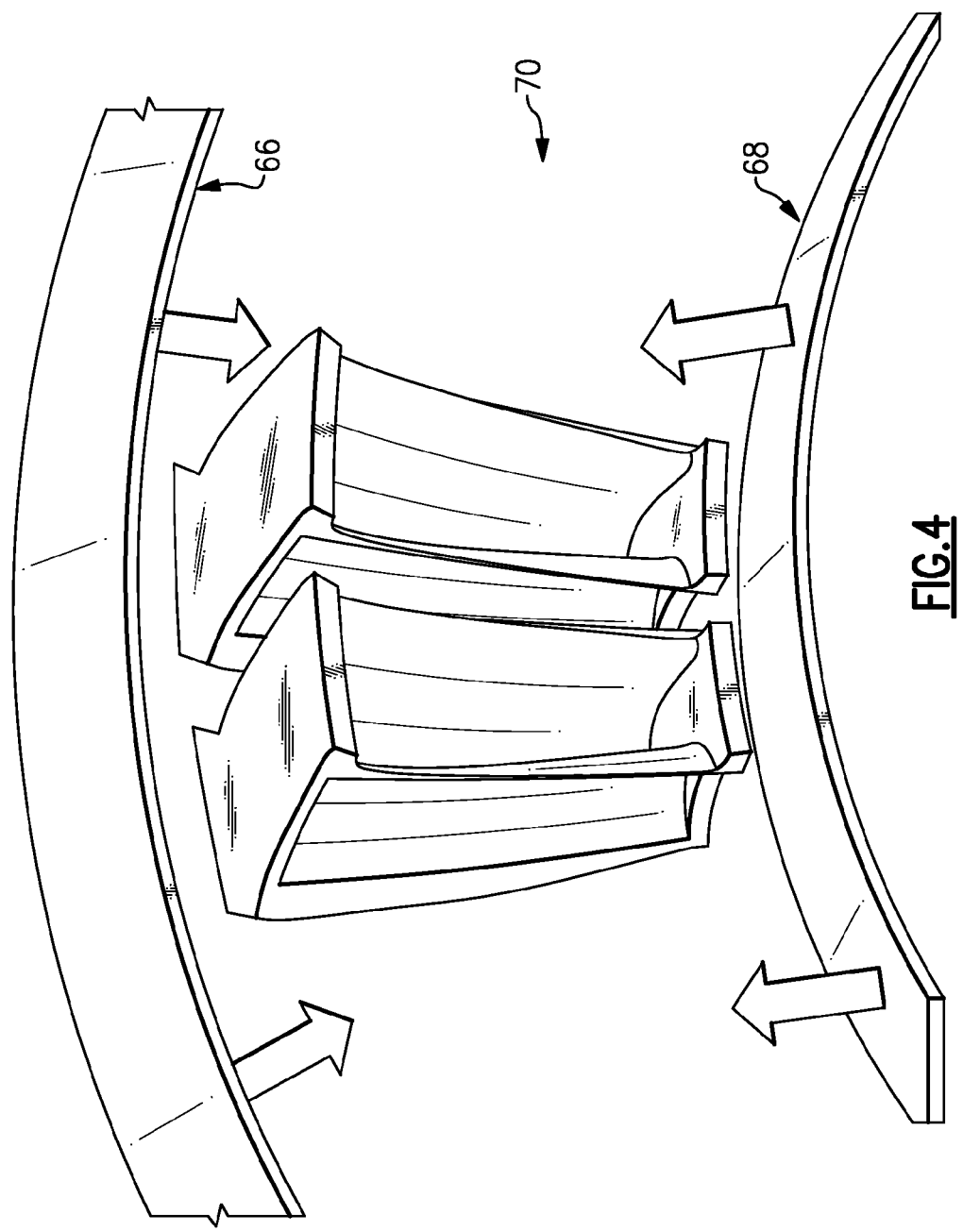
FIG. 4 is an exploded perspective view of the CMC ring vane structure for a gas turbine engine.

The vane structure 64B generally includes a CMC outer ring 66, a CMC inner ring 68 and a CMC airfoil section 70 therebetween (also illustrated in FIGS. 3 and 4). The CMC outer ring 66 and the CMC inner ring 68 include circumferentially wound fibers which form full hoops that are essentially wrapped about the airfoil section 70. It should be understood that various CMC manufacturability is applicable.

The CMC outer ring 66 may include a splined interface 72 for attachment to the low pressure turbine case 60. The low pressure turbine case 60 includes a support structure 74 which extend radially inward toward the engine axis A. The support structure 74 includes paired radial flanges 76A, 76B which receive the splined interface 72 therebetween. The splined interface 72 is axially centered along the airfoil sections 70 and include open slots 78 to receive a fastener 80 supported by the paired radial flanges 76A, 76B.

Figure 5:
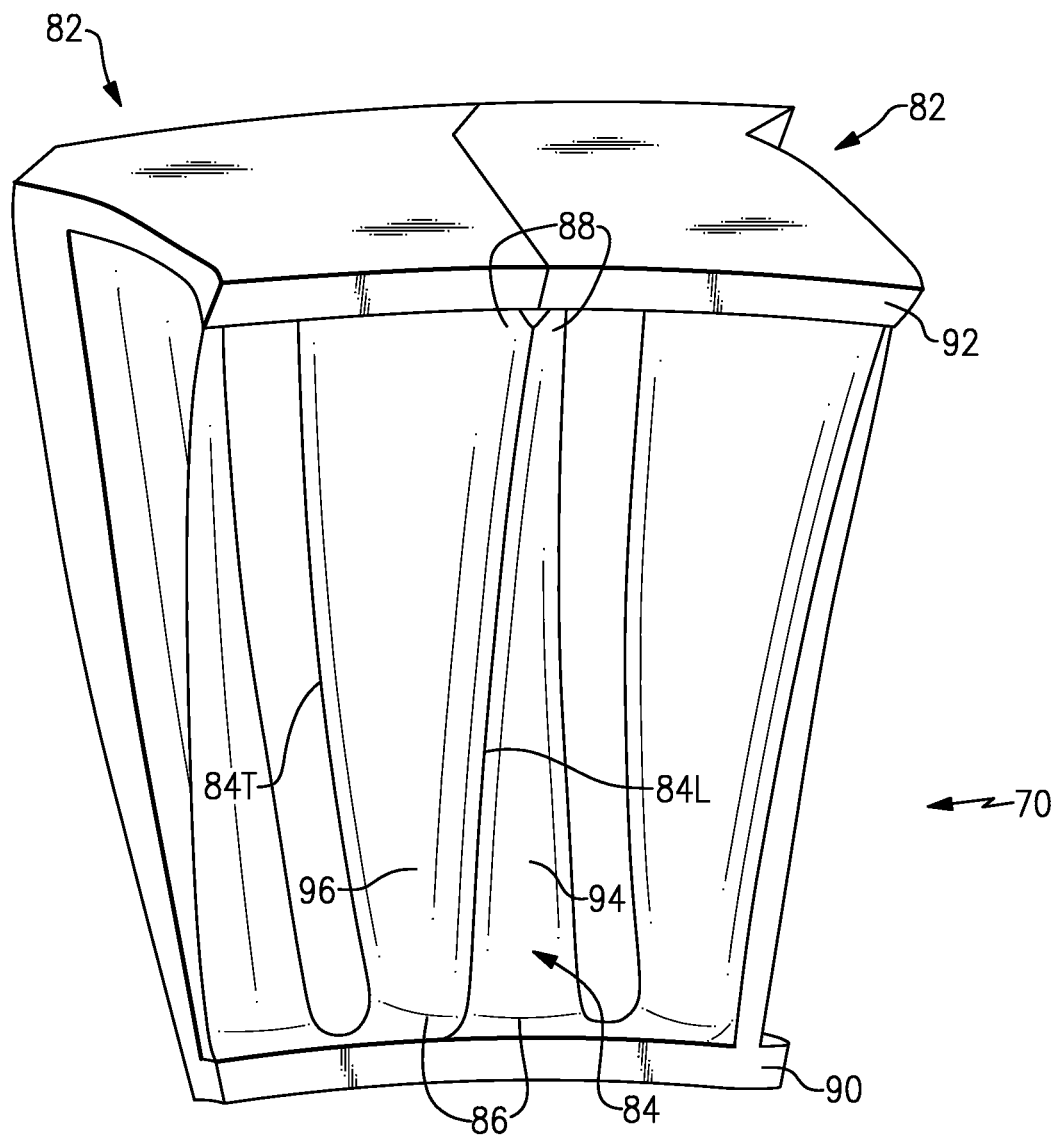
FIG. 5 is an assembled view of two CMC airfoil segments of the CMC ring vane structure.

With reference to FIG. 5, the CMC airfoil section 70 includes a multiple of CMC airfoil segments 82 (only two shown) which are assembled to form a multiple of airfoils 84 (FIG. 3). Although a somewhat generic airfoil 84 will be described herein, it should be understood that various rotary airfoils or blades and static airfoils or vanes such as those within the low pressure turbine may be particularly amenable to the fabrication described herein. Each airfoil 84 is defined between a respective leading edge 84L and a trailing edge 84T in which a fillet 86, 88 may provide a transition between the airfoil 84 and a respective platform portion 90, 92. The platform portions 90, 92 form the inner diameter and outer diameter of the core gas path. Each airfoil 84 is of a generally concave shaped portion which forms a pressure side 94 and a generally convex shaped portion which forms a suction side 96.

With reference to FIG. 6, each CMC airfoil segment 82 are generally comparable such that only a single CMC airfoil segment 82 need be described in detail. Each CMC airfoil segment 82 defines a pressure side portion 94P of one airfoil 84 and a suction side portion 84S of another airfoil 84. That is, each CMC airfoil segment 82 defines a portion of a single airfoil 84 such that the pressure side portion 84P of one CMC airfoil segment 82 mates with the suction side portion 84S of another adjacent CMC airfoil segment 82 to form a single airfoil portion 84 therebetween (FIG. 5). Such adjacent construction is continued such that a ring of CMC airfoil segments 82 define the CMC airfoil section 70.

The fabrication of each CMC airfoil segment 82 in the disclosed non-limiting embodiment utilizes a box-shape CMC fiber geometry 98 (illustrated schematically; FIG. 7A and FIG. 7B). The CMC fiber geometry 98A may include a multiple of discrete box shape geometries in a stacked arrangement or alternatively a coil like CMC fiber geometry 98B which forms the box shape. These box-shape geometries facilitate the integrity of the individual CMC structural fibers and allows the CMC airfoil segment 82 to be robustly connected to adjacent CMC airfoil segments 82 as well as the CMC outer ring 66 and the CMC inner ring 68 in an integral manner. That is, the box shape geometry provides for continuity in the internal stress carrying CMC structural fibers to achieve maximum strength-to-weight. It should be understood that various CMC manufacturability to provide the box shape geometry is applicable.

Each of the CMC airfoil segments 82 further define a rectilinear pressure side bond line 100P and a rectilinear suction side bond line 100S with respect to the circumferential division of the CMC airfoil segments 82 to preserve aerodynamic performance and provide a robust bond joint. The rectilinear bond lines 100P, 100S are generally aligned with the leading edge 84L, the trailing edge 84T and the respective platform portion 90, 92. It should be understood that the rectilinear bond lines 100P, 100S may not be contained with a single plane and may have a somewhat chambered shape. The rectilinear bond lines 100P, 100S are also transverse to the CMC fiber geometry 98 which define the box shape (FIG. 7).

Figure 9:
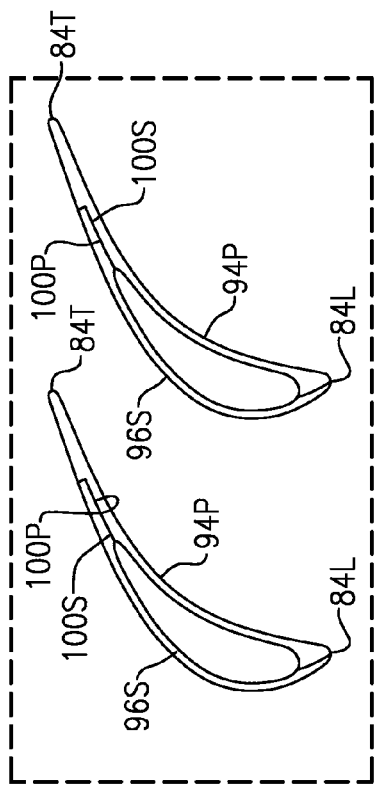
FIG. 9 is a sectional view of the three CMC airfoil segments taken along line 9-9 in FIG. 8.
Figure 8:
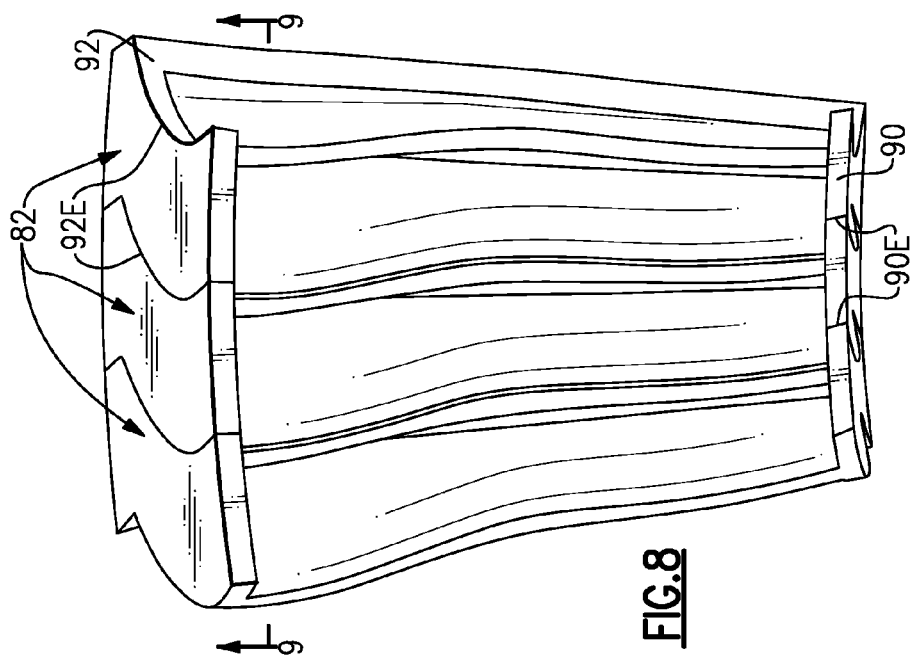
FIG. 8 is an assembled view of three CMC airfoil segments of the CMC ring vane structure.

With reference to FIG. 8, the bond line 100P in another disclosed non-limiting embodiment is offset from the trailing edge 84T (FIG. 9) to facilitate manufacture of a relatively thin trailing edge 82T. That is, the bond line 100P of the pressure side 84 differs from the suction side bond line 100S of the CMC airfoil segment 82.

The bond surface area defined by the rectilinear bond lines 100P, 100S is aligned parallel to the direction of pull due to centrifugal force at operating conditions and thus facilitates a strong joint. It should be understood that other bond line locations which are still generally rectilinear and aligned parallel to the direction of pull due to the box shape geometry may alternatively be provided.

Figure 10:
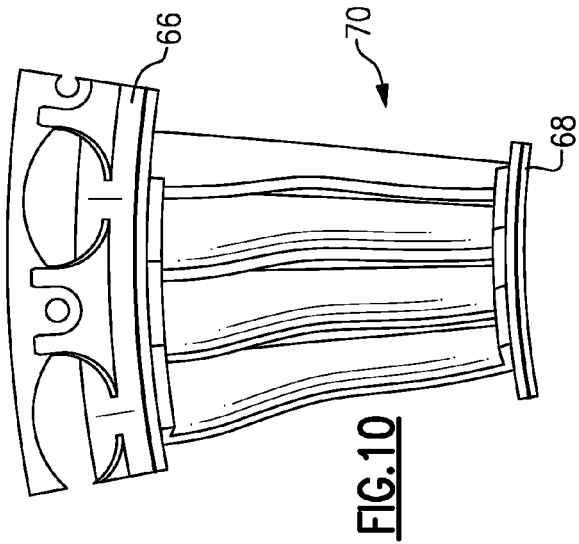
FIG. 10 is a front view of three CMC airfoil segments of the CMC ring vane structure.

The platform portions 90, 92 define complementary edge geometry 90E, 92E such that each abutting edge engages with the adjacent platform portions 90, 92 to facilitate the ring-strut-ring full hoop structure. That is, each of the CMC airfoil segments 82 are assembled in an adjacent complementary manner to form a ring of airfoils which are then wrapped with the CMC outer ring 66 and the CMC inner ring 68 about the multiple of the respectively adjacent platform portions 80, 82 (FIG. 10).

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A Ceramic Matrix Composite (CMC) airfoil segment for a gas turbine engine comprising:
a box shape CMC fiber geometry which defines a rectilinear pressure side bond line and a rectilinear suction side bond line, the airfoil segment defines a pressure side portion of a first airfoil and a suction side portion of a second airfoil, wherein said pressure side portion on said airfoil segment is configured to mate with a suction side portion of a second airfoil segment to form said first airfoil.

2. The Ceramic Matrix Composite airfoil segment as recited in claim 1, wherein each of said rectilinear pressure side bond line and said rectilinear suction side bond line are generally aligned with a leading edge, a trailing edge, an inner platform portion and an outer platform portion.

3. The Ceramic Matrix Composite airfoil segment as recited in claim 1, wherein said rectilinear pressure side bond line is offset from a trailing edge.

4. The Ceramic Matrix Composite airfoil segment as recited in claim 1, wherein each of said rectilinear pressure side bond line and said rectilinear suction side bond line are generally aligned parallel to a direction of pull due to centrifugal force.

5. The Ceramic Matrix Composite airfoil segment as recited in claim 1, wherein each of said rectilinear pressure side bond line and said rectilinear suction side bond line are defined by a portion of a respective airfoil section.

6. The Ceramic Matrix Composite airfoil segment as recited in claim 1, wherein said rectilinear pressure side bond line is defined along a portion of a pressure side of an airfoil section.

7. The Ceramic Matrix Composite airfoil segment as recited in claim 6, wherein a rectilinear suction side bond line defined along a portion of a suction side of an adjacent airfoil segment mates with said rectilinear pressure side bond line.

8. The Ceramic Matrix Composite airfoil segment as recited in claim 1, wherein said rectilinear suction side bond line is defined along a portion of a suction side of an airfoil section.

9. The Ceramic Matrix Composite airfoil segment as recited in claim 8, wherein a rectilinear pressure side bond line defined along a portion of a pressure side of an adjacent airfoil segment mates with said rectilinear suction side bond line.

10. The Ceramic Matrix Composite airfoil segment as recited in claim 8, wherein said box shape fiber geometry includes at least one ply of CMC material.

11. The Ceramic Matrix Composite airfoil segment as recited in claim 1, wherein the pressure side portion includes a pressure side bond surface for mating with a suction side bond surface on the suction side portion of the second airfoil segment.

12. A Ceramic Matrix Composite (CMC) structure for a gas turbine engine comprising:
an outer ring;
an inner ring; and
a multiple of CMC airfoil segments bonded between said outer ring and said inner ring, each of said multiple of CMC airfoil segments of a box shape CMC fiber geometry which defines a rectilinear pressure side bond line and a rectilinear suction side bond line, wherein each of said multiple of CMC airfoil segments includes a pressure side portion having a pressure side bond surface area and a suction side portion having a suction side bond surface area, wherein a pressure side bond surface area of a first airfoil segment mates with a suction side bond surface area of a second airfoil segment to form a first airfoil.

13. The Ceramic Matrix Composite (CMC) structure as recited in claim 12, wherein said multiple of CMC airfoil segments form an airfoil section within a Low Pressure Turbine ring vane.

14. The Ceramic Matrix Composite (CMC) structure as recited in claim 12, wherein said multiple of CMC airfoil segments are assembled in an adjacent complementary manner to form a ring of airfoils.

15. The Ceramic Matrix Composite (CMC) structure as recited in claim 12, wherein said outer ring is a CMC outer ring.

16. The Ceramic Matrix Composite (CMC) structure as recited in claim 12, wherein said inner ring is a CMC inner ring.

17. The Ceramic Matrix Composite (CMC) structure as recited in claim 12, wherein said outer ring is a CMC outer ring and said inner ring is a CMC inner ring.

18. A method of assembling a Ceramic Matrix Composite (CMC) structure for a gas turbine engine comprising:
bonding a pressure side bond surface area on a pressure side portion of a first CMC airfoil segment to a suction side bond surface area on a suction side portion of a second CMC airfoil segment at a rectilinear pressure side bond line of the first CMC airfoil segment to form a first airfoil; and
bonding a third CMC airfoil segment to a rectilinear suction side bond line of the first CMC airfoil segment.

19. The method as recited in claim 18, wherein each of the rectilinear pressure side bond line and the rectilinear suction side bond line are generally located along a leading edge, a trailing edge, an inner platform portion and an outer platform portion.

20. The method as recited in claim 18, wherein the first CMC airfoil segment and the second CMC airfoil segment each define a box shape fiber geometry.

21. The method as recited in claim 18, further comprising bonding the first CMC airfoil segment and the second CMC airfoil segment to a CMC outer ring and a CMC inner ring.

22. The method as recited in claim 18, wherein each of the rectilinear pressure side bond line and the rectilinear suction side bond line are generally located along an inner platform portion and an outer platform portion, the inner platform portion and the outer platform portion defines a complementary edge geometry between the first CMC airfoil segment and the second CMC airfoil segment.

23. The method as recited in claim 18, wherein the first CMC airfoil segment and the second CMC airfoil segment define a hollow airfoil.

24. The method as recited in claim 18, including bonding a pressure side bond surface area on a pressure side portion of the third CMC airfoil segment to a suction side bond surface area on a suction side portion of the first CMC airfoil segment at the rectilinear suction side bond line of the first CMC airfoil segment to form a second airfoil.

* * * * *